March 16, 1954 G. W. MacCHEYNE 2,672,592
SWITCHING DEVICE
Filed Sept. 29, 1948
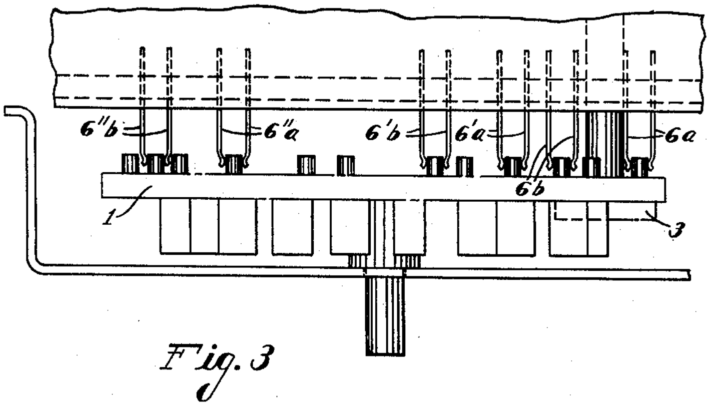
Fig. 3
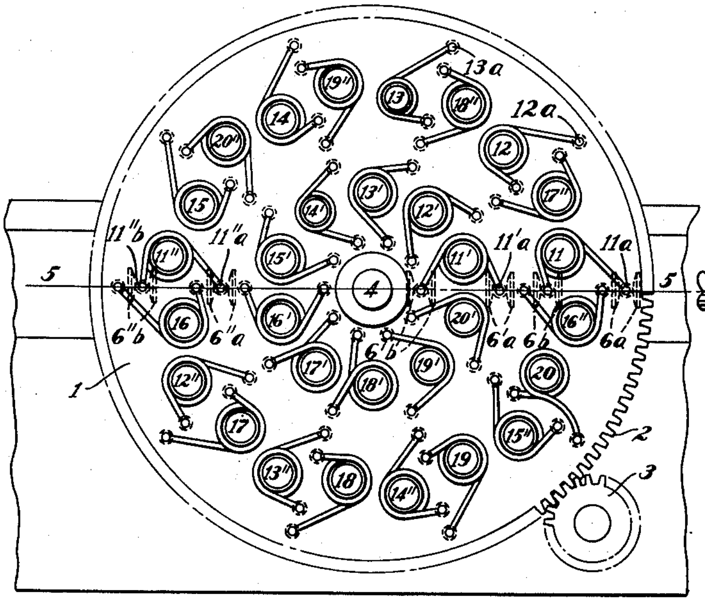
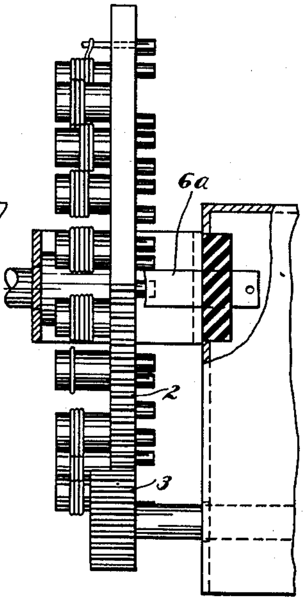
Fig. 1 Fig. 2
INVENTOR.
GEORGE W. MAC CHEYNE
BY T. L. Bowes
ATTORNEY Patented Mar. 16, 1954 2,672,592

UNITED STATES PATENT OFFICE 2,672,592

SWITCHING DEVICE

George W. MacCheyne, Rochester, N. Y., assignor to Stromberg-Carlson Company, a corporation of New York Application September 29, 1948, Serial No. 51,690

6 Claims. (Cl. 336—142)

My invention relates to switching devices, and more particularly to improvements in means for substituting, in an electrical circuit, any one of a plurality of sets of electrical components for any other set.

It is frequently necessary in an electrical circuit, such as the R. F. section of a radio receiver, for example, to change simultaneously the values of a number of inductances, capacitors, resistors, or some combination thereof. Furthermore, it is desirable to eliminate entirely from the circuit those components not in use. To minimize stray capacitance, the components are frequently mounted on a rotatable structure which also carries a set of contacts for each set of electrical components. By rotating this structure, the appropriate set of contacts may be connected to a stationary set of mating contacts. In the R. F. section of radio or television receivers, such an arrangement is frequently referred to as a "coil-changing turret." Where a large number of electrical components must be accommodated in a single device, the physical spacing between contacts necessitates a large physical size for the device and a large amount of material. The latter consideration is important where the device is to be molded from a relatively expensive low-loss plastic, such as polystyrene.

It is accordingly an object of my invention to provide means for substituting, in an electrical circuit, any one of a plurality of sets of electrical components for any other set which occupies less space than means heretofore employed.

It is a further object of my invention to provide means for substituting, in an electrical circuit, any one of a plurality of sets of electrical components for any other set, which requires less material than means heretofore employed.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawing, of which Fig. 1 shows a front elevation.

Fig. 2 shows a side elevation of my invention.

Fig. 3 is a top view of my device.

In the illustrated embodiment of my invention, there is provided a support such as a disk 1 which may have teeth 2 arranged to mesh with pinion 3, although any means for enabling the disk to be rotated at will may be used. Mounted in interspersed relationship on the disk are a plurality of sets of coils, ten sets being shown, each set comprising one or more coils, three coils being indicated by the unprimed, primed, and double primed numerals. The numbers of the sets are indicated by the numerals 11 through 20. Each coil in each set is provided with two contacts, as indicated for set 11 by the "*a*" or "*b*" suffixed to the coil designation. Designations of the contacts for the remaining sets have been omitted because of space limitations, but the contacts are correspondingly located.

In previous practice it has been customary to locate all coils (or other electrical components) of each set on a radial line from the center of rotation 4 of the disk 1. This causes crowding of the contacts near the center, and results in inadequate spacing.

According to my invention, I dispose the contacts of a given set, say, set 11 (comprising coils 11, 11′ and 11″) along a diametrical line, in this case line 5—5. Some of the contacts, such as 11″*a* and 11″*b*, I place on one side of the center of rotation 4, and the remainder I place on the other side. I choose the radial distance from any one contact to the center of rotation different from that of any other contact in the same set, but the same as the corresponding contacts of every other set; that is, the distance from the center of rotation to contact 11*a* is the same as to contacts 12*a*, 13*a*, etc. By rotating disk 1 through 180°, it will be seen that all contacts of set 11 are disengaged from the fixed mating contact means 6*a*, 6*b*, 6′*a*, 6′*b*, 6″*a*, and 6″*b*. At the same time, however, the corresponding contacts of set 16 are engaged with these fixed contacts. Since the double use of each diametrical line allows two sets of components to be accommodated, I require a smaller diameter for disk 1 than if all contacts of each set were placed on one side of the axis of rotation 4. By choosing, in the case of sets of coils, resonant frequencies for coil set 11 far removed from set 16 (and similarly for other paired sets of coils), I avoid capacitive loading effects on any given diametrical line. Likewise, such effects are minimized between adjacent sets of coils, such as 11 and 12, because of the relatively greater inter-contact spacing made possible by my invention.

While I have shown and described a specific embodiment of my invention, other modifications will be readily apparent to those skilled in the art. I do not, therefore, desire my invention to be limited to the specific arrangement shown and described. For example, a drum-like structure might be used instead of disk 1, the electrical component being mounted within it, or the sets of contacts might be mounted on the curved surface of a cylinder or the faces of a polyhedron. I intend in the appended claims to cover all modifications within the spirit and scope of my invention.

I claim:

1. In apparatus for substituting, in an electrical circuit, any one of a plurality of sets of electrical components for any other set, a disk arranged to be rotated at will to a desired position; said sets of electrical components being mounted on said disk; means for supporting said disk for rotation; a plurality of sets of electrical contacts also carried by said disk, each set of contacts being connected to a corresponding one of said sets of components and each set of said contacts being disposed along a diametrical line through the axis of rotation of said disk, some contacts in said set being located on one side of said axis and the remaining contacts of said set being located on the other side of said axis, the radial distance of each contact from said axis being different from that of every other contact in its own set but the same as that of the corresponding contact in all other sets; and a set of stationary contacts connected to said electrical circuit and mounted in fixed relationship to said supporting means, and arranged to mate with any one of said sets of contacts.

2. In a means for substituting, in an electrical circuit, any one of a plurality of sets of electrical components for any other set, rotatable mounting means for said sets of components; a plurality of sets of contacting means secured to said mounting means, each set being connected to a corresponding one of said sets of components; supporting means for said rotatable mounting means; mating contact means arranged to engage said contacting means, said mating contact means being fixed with respect to said supporting means; each set of said contacting means being disposed along a diametrical line individual to that set and passing at right angles through the axis of rotation of said mounting means, part of each set of contacting means being on one side of said axis and the remainder on the other side, and so positioned that the radial distance from each of said contacting means to said axis is different than that of any other of said contacting means in that set, but is the same as that of the corresponding contacting means in every other set, whereby a set of contacting means may be connected to said mating contact means at any given time by rotating said mounting means until the desired set of said contacting means reaches said mating contact means, while at the same time all other contacts are excluded from said electrical circuit.

3. In an arrangement for connecting any desired one of a plurality of sets of electrical components into an electrical circuit, a driven member rotatable about an axis, said sets of components being mounted on said driven member; a driving member; supporting means for said driven and said driving members; a plurality of sets of contacting means also mounted on said driven member, each of said sets of components being connected to a corresponding one of said sets of contacting means; a set of mating contacting means arranged to mate with said contacting means and mounted in fixed relationship to said supporting means; said set of mating contacting means being connected to said electrical circuit; each of said sets of contacting means being diametrically disposed along a line individual to that set and passing at right angles through said axis; some contacting means of each set being disposed on one side of said axis and the remaining contacting means of each set being disposed on the other side of said axis; each of said sets of contacting means being arranged such that the set of contacting means being used at a given time is engaged with said mating contact means while all contacts of the sets not in use are disengaged.

4. In an arrangement for substituting components in an electrical circuit, a plurality of sets of electrical components, each having at least a pair of terminal points for electrical connection, a member rotatable about an axis, means for mounting said sets of components in interspersed relationship on said member, means for supporting said member, a plurality of groups of sets of contacting means also mounted on said member, and means for connecting said terminal points of each of said components to a corresponding one of said sets of contacting means, the said contacting means corresponding to a single component being disposed along a single radius of said member, each of said sets of contacting means being disposed in a plane perpendicular to said axis of rotation and each group of said contacting means being disposed along a plurality of radiuses of said member.

5. A device for substituting components in an electrical circuit comprising, a support element having two substantially flat surface areas, means for mounting said support element for rotation about an axis substantially perpendicular to said surfaces, a plurality of groups of electrical components, means for mounting said electrical components in interspersed relationship on one of said surfaces, contact means projecting from the other of said surfaces, and means for extending an electrical connection from each of said components to said contact means.

6. In an arrangement for connecting any desired one of a plurality of sets of electrical components into an electrical circuit, a member mounted for rotation about an axis, said sets of components being mounted in interspersed relationship on said member; a plurality of sets of contacting means also mounted on said member, each of said sets of components being connected to a corresponding one of said sets of contacting means; and a set of mating contacting means connected in said electrical circuit and mounted in fixed relationship to the first-mentioned contacting means; each of said sets of components being disposed along a plurality of radiuses of said member, those of the first-mentioned contacting means which correspond to any single component being disposed along a single radius of said member.

GEORGE W. MACCHEYNE.

References Cited in the file of this patent

UNITED STATES PATENTS

| Number | Name | Date |
|---|---|---|
| 1,986,525 | Pfaff | Jan. 1, 1935 |
| 2,075,396 | Keim | Mar. 30, 1937 |
| 2,078,908 | Harrison | Apr. 27, 1937 |
| 2,078,909 | Gunther | Apr. 27, 1937 |
| 2,103,035 | Lear | Dec. 21, 1937 |
| 2,423,152 | Mitchell | July 1, 1947 |
| 2,496,183 | Thias et al. | Jan. 31, 1950 |